US008306393B2

(12) United States Patent
Yamasaki et al.

(10) Patent No.: US 8,306,393 B2
(45) Date of Patent: *Nov. 6, 2012

(54) INFORMATION RECORDING APPARATUS, INFORMATION COPYING SYSTEM, METHOD FOR COPYING INFORMATION, PROGRAM AND COMPUTER READABLE RECORDING MEDIUM

(75) Inventors: Fumitomo Yamasaki, Nara (JP); Takao Hayashi, Toyonaka (JP); Hideki Aikoh, Higashiosaka (JP)

(73) Assignee: Panasonic Corporation, Osaka (JP)

( * ) Notice: Subject to any disclaimer, the term of this patent is extended or adjusted under 35 U.S.C. 154(b) by 1377 days.

This patent is subject to a terminal disclaimer.

(21) Appl. No.: 11/998,260

(22) Filed: Nov. 29, 2007

(65) Prior Publication Data

US 2008/0095513 A1    Apr. 24, 2008

Related U.S. Application Data

(63) Continuation of application No. 10/482,492, filed as application No. PCT/JP02/09525 on Sep. 17, 2002, now Pat. No. 7,327,935.

(30) Foreign Application Priority Data

Nov. 27, 2001   (JP) .................................. 2001-360544

(51) Int. Cl.
*H04N 9/80* (2006.01)
*H04N 5/92* (2006.01)
*H04N 5/93* (2006.01)
*H04N 5/222* (2006.01)
*H04N 5/232* (2006.01)
*H04N 7/167* (2011.01)
*H04L 9/32* (2006.01)
*H04L 29/06* (2006.01)
*G11B 5/09* (2006.01)

(52) U.S. Cl. ... 386/252; 386/280; 386/338; 348/211.11; 348/333.05; 369/47.12; 380/201; 380/203; 380/216; 380/217; 380/229; 380/242; 713/164; 713/165; 713/176

(58) Field of Classification Search .................... 386/94, 386/4, 52, 96; 348/211.11, 333.05; 369/47.12; 380/201, 203, 216, 217, 229, 242; 713/164, 713/165, 176
See application file for complete search history.

(56) References Cited

U.S. PATENT DOCUMENTS 5,859,950 A * 1/1999 Iwamoto .................. 386/94
(Continued)

FOREIGN PATENT DOCUMENTS

EP      1 096 499 A2    10/2000
(Continued)

*Primary Examiner* — Thai Tran
*Assistant Examiner* — Syed Hasan
(74) *Attorney, Agent, or Firm* — Hamre, Schumann, Mueller & Larson, P.C.

(57) ABSTRACT

A first information recorder comprises a limited number-of-times of copying information setting unit for setting information on the limited number-of-times of copying electronic data, a first limited number-of-times of copying information updating unit for reading out the electronic data from a first information recording medium containing electronic data set with limited number of times of copying information by the limited number-of-times of copying information setting unit and updating the limited number-of-times of copying information set with respect to the electronic data, and a first transmitter for transmitting electronic data whose limited number-of-times of copying information is updated by the first limited number of times of copying information updating unit. A second information recorder comprises a second receiver for receiving electronic data transmitted from the first transmitter, a second limited number-of-times of copying information updating unit for reading out the electronic data from a second information containing medium recording the electronic data and updating the limited number-of-times of copying information set with respect to the electronic data, and a second transmitter for transmitting electronic data whose limited number-of-times of copying information is updated by the second limited number-of-times of copying information updating unit.

12 Claims, 10 Drawing Sheets

U.S. PATENT DOCUMENTS

| | | | |
|---|---|---|---|
| 5,960,151 A | 9/1999 | Takahashi | |
| 6,188,431 B1* | 2/2001 | Oie | 348/211.5 |
| 6,314,518 B1* | 11/2001 | Linnartz | 713/176 |
| 6,526,510 B1* | 2/2003 | Kori et al. | 713/176 |
| 6,859,790 B1 | 2/2005 | Nonaka et al. | |
| 2002/0003879 A1 | 1/2002 | Ibaraki et al. | |
| 2002/0152381 A1 | 10/2002 | Kuriya et al. | |
| 2005/0200687 A1* | 9/2005 | Silverbrook et al. | 347/109 |

FOREIGN PATENT DOCUMENTS

| | | |
|---|---|---|
| JP | 5-153453 | 6/1993 |
| JP | 5-325412 A | 10/1993 |
| JP | 2000-078515 | 3/2000 |
| JP | 2000-125237 | 4/2000 |
| JP | 2001-086449 | 3/2001 |
| JP | 2001-118332 | 4/2001 |
| JP | 2001-125833 A | 11/2001 |

* cited by examiner

INFORMATION RECORDING APPARATUS, INFORMATION COPYING SYSTEM, METHOD FOR COPYING INFORMATION, PROGRAM AND COMPUTER READABLE RECORDING MEDIUM

CROSS-REFERENCE TO RELATED APPLICATIONS

This application is a Continuation of application Ser. No. 10/482,492, filed Dec. 31, 2003, which is a U.S. National Stage Application of international no. PCT/JP02/09525, filed Sep. 17, 2002, which applications are incorporated herein by reference.

TECHNICAL FIELD

The present invention relates to an information recording apparatus capable of mutually copying image data recorded in an information recording medium.

BACKGROUND ART

A digital camera can convert light, which passes through a lens and after being reflected from a subject, into digital image data representing a still picture image or a motion picture image of the subject and record the converted digital data in an information recording medium such as a semiconductor memory, an optical disk and a floppy disk, and the like. Furthermore, the digital camera can reproduce the still picture image or the motion picture image represented by digital image data recorded in the information recording medium.

FIG. 11 is a block diagram showing a configuration of a conventional digital camera 90. The digital camera 90 includes an image pickup unit 11. The image pickup unit 11 picks up an image of a subject based on light reflected by the subject so as to generate an image pickup signal and outputs the image pickup signal to an image data generator 12.

The image data generator 12 generates image data based on the image pickup signal output from the image pickup unit 11 and outputs the image data to a monitor 13. The monitor 13 displays images represented by the image data output from the image data generator 12. Thus, the monitor 13 functions as a viewfinder for displaying the images represented by the image data generated based on the light reflected by the subject.

The image data generator 12 also generates image data based on the image pickup signal obtained by the image pickup unit 11 by pressing a shutter (not shown) and outputs the image data to a controller 95. The controller 95 records the image data output from the image data generator 12 in an information recording medium 9. The image data recorded in the information recording medium 9 is copied and stored in a fixed disk provided in a personal computer (not shown) so that jobs such as browsing, editing, processing, printing, and the like, are carried out.

When the image data recorded in the information recording medium 9 are copied in the fixed disk provided in the personal computer (not shown), in general, the information recording medium 9 in which the image data are recorded is detached from a main body of the digital camera 90 and the image data recorded in the information recording medium 9 are copied in the fixed disk via a memory card reader or a disk drive connected to the personal computer, or the image data recorded in the information recording medium 9 are copied in the fixed disk by directly operating from the personal computer via the controller 95 provided in the digital camera 90 in a state in which the main body of the digital camera 90 and the personal computer are connected to each other by a cable (not shown).

The image data representing a still picture or a motion picture taken by a digital camera are recorded by a personal computer in a general file format that is suitable for carrying out jobs such as browsing, editing, processing and printing, etc. For example, a still picture is recorded in the information recording medium in accordance with a JPEG format and a motion picture is recorded in the information recording medium in accordance with a QuickTime format.

However, since these image data are not protected from the viewpoint of copyright protection, they can be distributed freely regardless of the intention of a person who took the image data. Since the performances of the digital cameras are improved, the value as a work of the image data taken by a digital camera is increasing. Therefore, also a work of an image data taken by a digital camera must be protected as a copyrighted work similarly to a video work recorded in, for example, a DVD.

With the foregoing in mind, the object of the present invention is to provide an information recording apparatus capable of protecting justifiable copyright with respect to electronic data recorded in the information recording medium.

DISCLOSURE OF INVENTION

The information recording apparatus according to the present invention includes a receiver for receiving electronic data transmitted from a first transmitter, the first transmitter being provided in a device having a limited number-of-times of copying information setting unit for receiving predetermined electronic data and setting limited number-of-times of copying information, which shows the number-of-times permitted for copying the electronic data, with respect to the electronic data, a first limited number-of-times of copying information updating unit for reading out the electronic data from a first information recording medium in which the electronic data with the limited number-of-times of copying information set by the limited number-of-times of copying information setting unit are recorded and updating the limited number-of-times of copying information set with respect to the read electronic data, with the first transmitter transmitting the electronic data whose limited number-of-times of copying information is updated by the first limited number of times of copying information updating unit; a second limited number-of-times of copying information updating unit for reading out the electronic data from a second information recording medium in which the electronic data received by the receiver are recorded; and a second transmitter for transmitting the electronic data whose limited number-of-times of copying information is updated by the second limited number-of-times of copying information updating unit.

The information copying system according to the present invention includes a first information recording apparatus; and a second information recording apparatus. The first information recording apparatus includes a limited number-of-times of copying information setting unit for receiving predetermined electronic data and setting limited number-of-times of copying information, which shows the number-of-times permitted for copying the electronic data, with respect to the electronic data, a first limited number-of-times of copying information updating unit for reading out the electronic data from a first information recording medium in which the electronic data with the limited number-of-times of copying information set by the limited number-of-times of copying information setting unit are recorded, and updating the limited number-of-times of copying information set with respect to the read electronic data, and a first transmitter for transmitting the electronic data whose limited number-of-times of copying information is updated by the first limited number-of-times of copying information updating unit. The second information recording apparatus includes a second receiver for receiving the electronic data transmitted from the first transmitter provided in the first information recording apparatus, a second limited number-of-times of copying information updating unit for reading out the electronic data from the second information recording medium in which the electronic data received by the second receiver are recorded, and updating the limited number-of-times of copying information set with respect to the read electronic data, and a second transmitter for transmitting the electronic data whose limited number-of-times of copying information is updated by the second limited number-of-times of copying information updating unit.

The method for copying information according to the present invention includes a limited number-of-times of copying information setting step for receiving predetermined electronic data and setting the limited number-of-times of copying information showing the number-of-times permitted for copying the electronic data with respect to the electronic data; a first limited number-of-times of copying information updating step for reading out the electronic data from a first information recording medium in which the electronic data with the limited number-of-times of copying information set by the limited number-of-times of copying information setting step are recorded, and updating the limited number-of-times of copying information set with respect to the read electronic data; a first transmitting step for transmitting the electronic data whose limited number-of-times of copying information is updated by the first limited number of times of copying information updating step, a second receiving step for receiving the electronic data transmitted by the first transmitting step; a second limited number-of-times of copying information updating step for reading out the electronic data from a second information recording medium in which the electronic data received by the second receiving step, and updating the limited number-of-times of copying information set with respect to the read electronic data; and a second transmitting step for transmitting the electronic data whose limited number-of-times of copying information is updated by the second limited number-of-times of copying information updating step.

The program according to the present invention executes by a computer: a limited number-of-times of copying information setting step for receiving predetermined electronic data and setting a limit on the number-of-times of copying information showing the number-of-times permitted for copying the electronic data with respect to the electronic data; a first limited number-of-times of copying information updating step for reading out the electronic data from a first information recording medium in which the electronic data with the limited number-of-times of copying information set by the limited number-of-times of copying information setting step are recorded, and updating the limited number-of-times of copying information set with respect to the read electronic data; a first transmitting step for transmitting the electronic data whose limited number-of-times of copying information is updated by the first limited number of times of copying information updating step; a second receiving step for receiving the electronic data transmitted by the first transmitting step; a second limited number-of-times of copying information updating step for reading out the electronic data from a second information recording medium in which the electronic data received by the receiver are recorded and updating the limited number-of-times of copying information set with respect to the read electronic data; and a second transmitting step for transmitting the electronic data whose limited number-of-times of copying information is updated by the second limited number-of-times of copying information updating step.

In the computer readable recording medium according to the present invention, a program is recorded. The program executes by a computer: a limited number-of-times of copying information setting step for receiving predetermined electronic data and setting a limit on the number-of-times of copying information showing the number-of-times permitted for copying the electronic data in the electronic data; a first limited number-of-times of copying information updating step for reading out the electronic data from a first information recording medium in which electronic data with the limited number-of-times of copying information set by the limited number-of-times of copying information setting step are recorded, and updating the limited number-of-times of copying information set with respect to the read electronic data; a first transmitting step for transmitting the electronic data whose limited number-of-times of copying information is updated by the first limited number of times of copying information updating step; a second receiving step for receiving the electronic data transmitted by the first transmitting step; a second limited number-of-times of copying information updating step for reading out the electronic data from a second information recording medium in which the electronic data received by the receiver are recorded, and updating the limited number-of-times of copying information set with respect to the read electronic data; and a second transmitting step for transmitting the electronic data whose limited number-of-times of copying information is updated by the second limited number-of-times of copying information updating step.

BEST MODE FOR CARRYING OUT THE INVENTION

Figure 1:
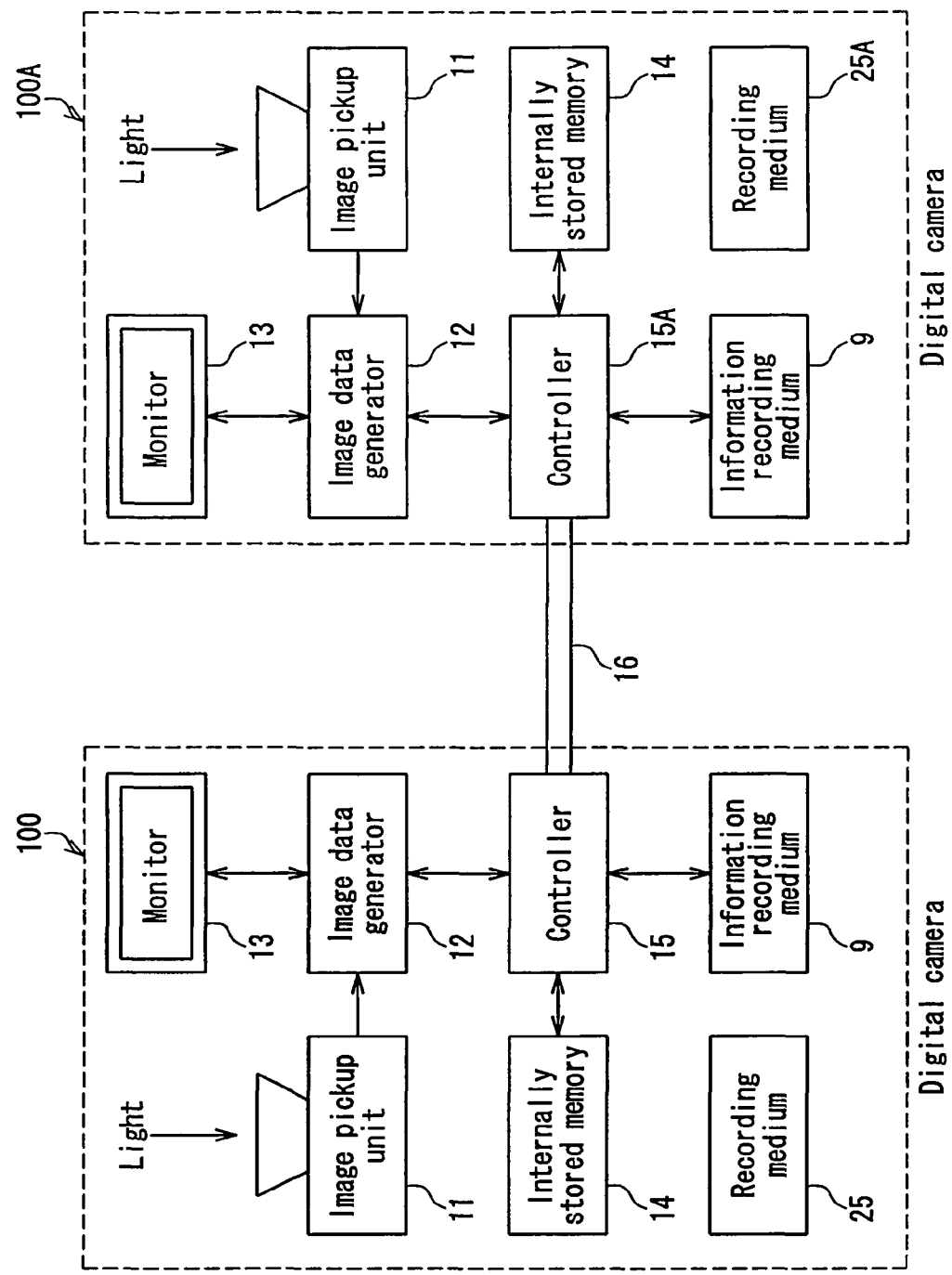
FIG. 1 is a block diagram showing a configuration of a digital camera system according to this embodiment.

In the information copying system of this embodiment, a limited number-of-times of copying information showing the number-of-times permitted for copying electronic data is updated by a second limited number-of-times of copying information updating unit. Therefore, when the number-of-times shown by the limited number-of-times of copying information becomes 0 after being updated, the transmission of electronic data for copying the electronic data can be inhibited. As a result, it is possible to prevent the electronic data from being distributed despite the intention of a copyright owner who set the number of times-of-times permitted for copying the electronic data.

It is preferable that the limited number-of-times of copying information setting unit provided in the first information recording apparatus sets the limited number-of-times of copying information N (N is a natural number of 1 or more) with respect to the electronic data, the first limited number-of-times of copying information updating unit updates the limited number-of-times of copying information to the number-of-times of M (M is an integer of 0 or more and N−1 or less) by performing a subtraction, and the second limited number-of-times of copying information updating unit provided in the second information recording apparatus updates the limited number-of-times of copying information that is not 0 to the number-of-times of R (R is an integer of 0 or more and M−1 or less) when the limited number-of-times of copying information set with respect to the read electronic data is not 0.

It is preferable that the second information recording apparatus further includes: a transmission inhibiting unit for inhibiting the transmission of the electronic data when the limited number-of-times of copying information set with respect to the electronic data is 0.

It is preferable that the electronic data are image data, and the first information recording apparatus further includes an image pickup unit for picking up an image of a subject to generate an image pickup signal, and an image data generating unit for generating the image data based on the image pickup signal generated by the image pickup unit and outputting the generated image data to the limited number-of-times of copying information setting unit.

The second limited number-of-times of copying information updating unit provided in the second information recording apparatus updates the limited number-of-times of copying information set with respect to the electronic data recorded in the second information recording medium from the number-of-times of M to the number-of-times of (M−(R+1)) when the limited number-of-times of copying information set with respect to the read electronic data is updated to the number-of-times of R.

It is preferable that the limited number-of-times of copying information set with respect to the electronic data by the limited number-of-times of copying information setting unit is recorded in a predetermined region of the first information recording medium.

It is preferable that the information copying system further includes: a third information recording apparatus and that the third information recording apparatus includes a third receiver for receiving the electronic data transmitted from the second transmitter provided in the second information recording apparatus, a third information recording medium for recording the electronic data received by the third receiver, a third limited number-of-times of copying information updating unit for updating the limited number-of-times of copying information that is not 0 when the limited number-of-times of copying information set with respect to the electronic data read out from the third information recording medium is not 0, a third transmitter for transmitting the electronic data whose limited number-of-times of copying information is updated by the third limited number-of-times of copying information updating unit, and a transmission inhibiting unit for inhibiting the transmission of the electronic data when the limited number-of-times of copying information set with respect to the electronic data is 0.

It is preferable that the first information recording apparatus further includes a first receiver for receiving the electronic data transmitted from the second transmitter provided in the second information recording apparatus, and the limited number-of-times of copying information setting unit is provided in such a manner in which the limited number-of-times of copying information of the electronic data received by the first receiver can be changed freely.

It is preferable that the second information recording apparatus further includes: a limited number-of-times of copying information changing unit provided in such a manner in which the limited number-of-times of copying information of the electronic data recorded in the second information recording medium can be changed freely in accordance with the input of a predetermined password set at the same time when the limited number-of-times of copying information is set with respect to the electronic data by the limited number-of-times of copying information setting unit provided in the first information recording apparatus.

It is preferable that the electronic data are recorded in the first information recording medium in accordance with at least one format selected from the group consisting of a file storing format whose copyright is protected and a file storing format whose copyright is not protected.

It is preferable that the electronic data can be converted between the file storing format whose copyright is protected and the file storing format whose copyright is not protected.

It is preferable that the first and second information recording apparatuses are digital cameras.

Hereinafter, this embodiment of the present invention will be explained with reference to the drawings.

FIG. 1 is a block diagram showing a configuration of a digital camera system according to this embodiment. The digital camera system includes digital cameras 100 and 100A. The digital camera 100 includes an image pickup unit 11. The image pickup unit 11 picks up a subject's image based on light reflected by the subject so as to generate an image pickup signal and outputs the image pickup signal to a generator 12.

The image data generator 12 generates image data based on the image pickup signal output from the image pickup unit 11 and outputs the image data to a monitor 13. The monitor 13 displays images represented by the image data output from the image data generator 12. Thus, the monitor 13 functions as a viewfinder for displaying the images represented by image data generated based on the light reflected by the subject.

The image data generator 12 also generates image data based on the image pickup signal obtained by the image pickup unit 11 by pressing a shutter (not shown) and outputs the image data to a controller 15.

In the digital camera 100A, the same reference numbers are given to the same component elements as those of the above-mentioned digital camera 100, and therefore, the detail explanations therefor are omitted herein. The difference between the digital camera 100A and the above-mentioned digital camera 100 is that a controller 15A is provided instead of the controller 15. The controller 15 provided in the digital camera 100 and the controller 15A provided in the digital camera 100A are connected to each other via a cable 16.

Figure 2:
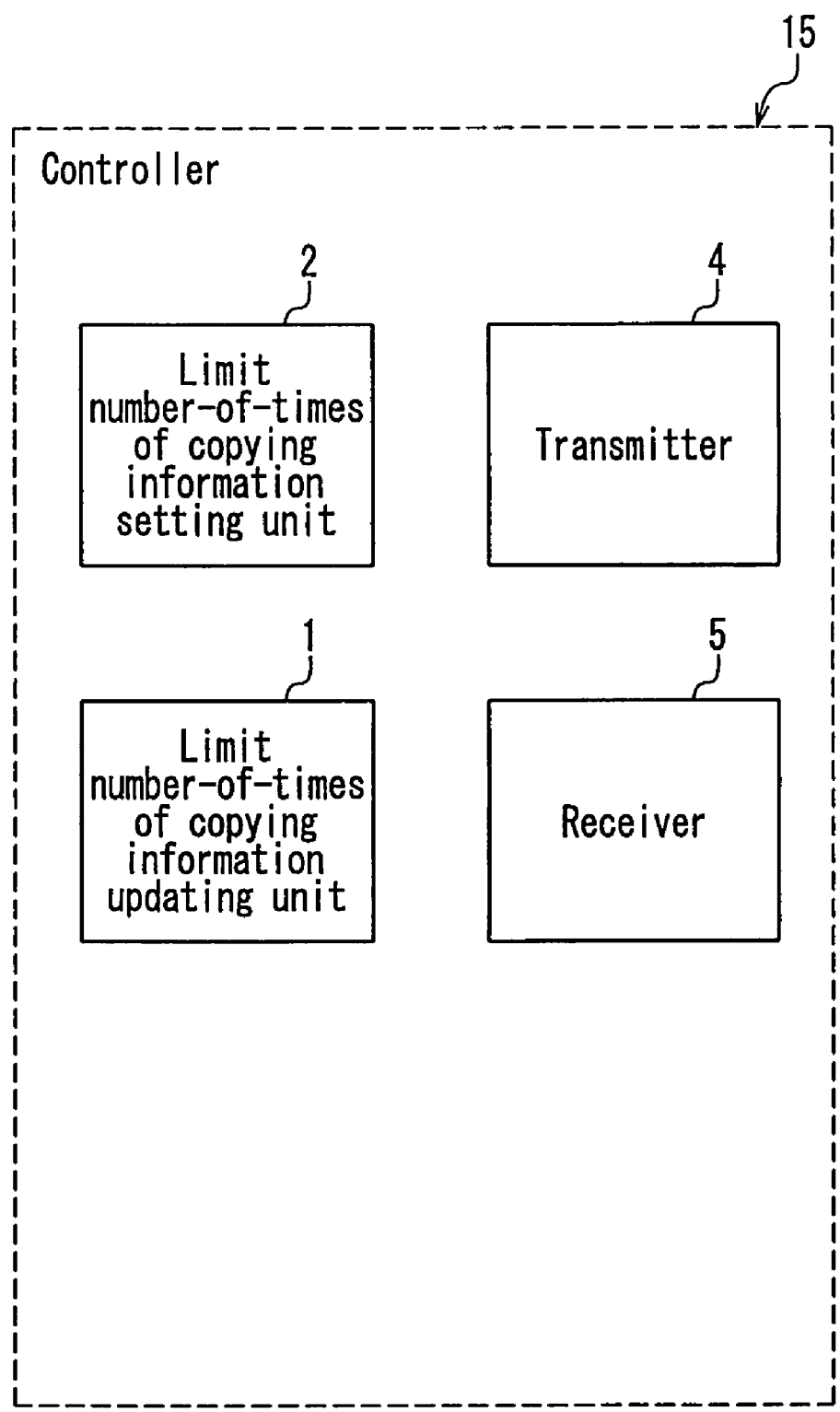
FIG. 2 is a block diagram showing a configuration of a controller provided in a digital camera constituting a digital camera system according to this embodiment.

FIG. 2 is a block diagram showing a configuration of the controller 15 provided in the digital camera 100. The controller 15 includes a limited number-of-times of copying information setting unit 2. The unit 2 receives image data from the image data generator 12, sets the limited number-of-times of copying information, showing the number-of-times permitted for copying the image data, in the image data, and records the image data with the limited number-of-times of copying information set with respect to the information recording medium 9.

The controller 15 is provided with a limited number-of-times of copying information updating unit 1. The limited number-of-times of copying information updating unit 1 reads out image data into an internally stored memory 14 from the information recording medium 9, which includes the image data with the limited number-of-times of copying information set by the unit 2, and updates the limited number-of-times of copying information set with respect to the read image data.

The controller 15 includes a transmitter 4. The transmitter 4 transmits the image data whose limited number-of-times of copying information is updated by the unit 1 to the controller 15A provided in the digital camera 100A via the cable 16. The controller 15 is provided with a receiver 5. The receiver 5 receives the image data and records them in the information recording medium 9.

Figure 3:
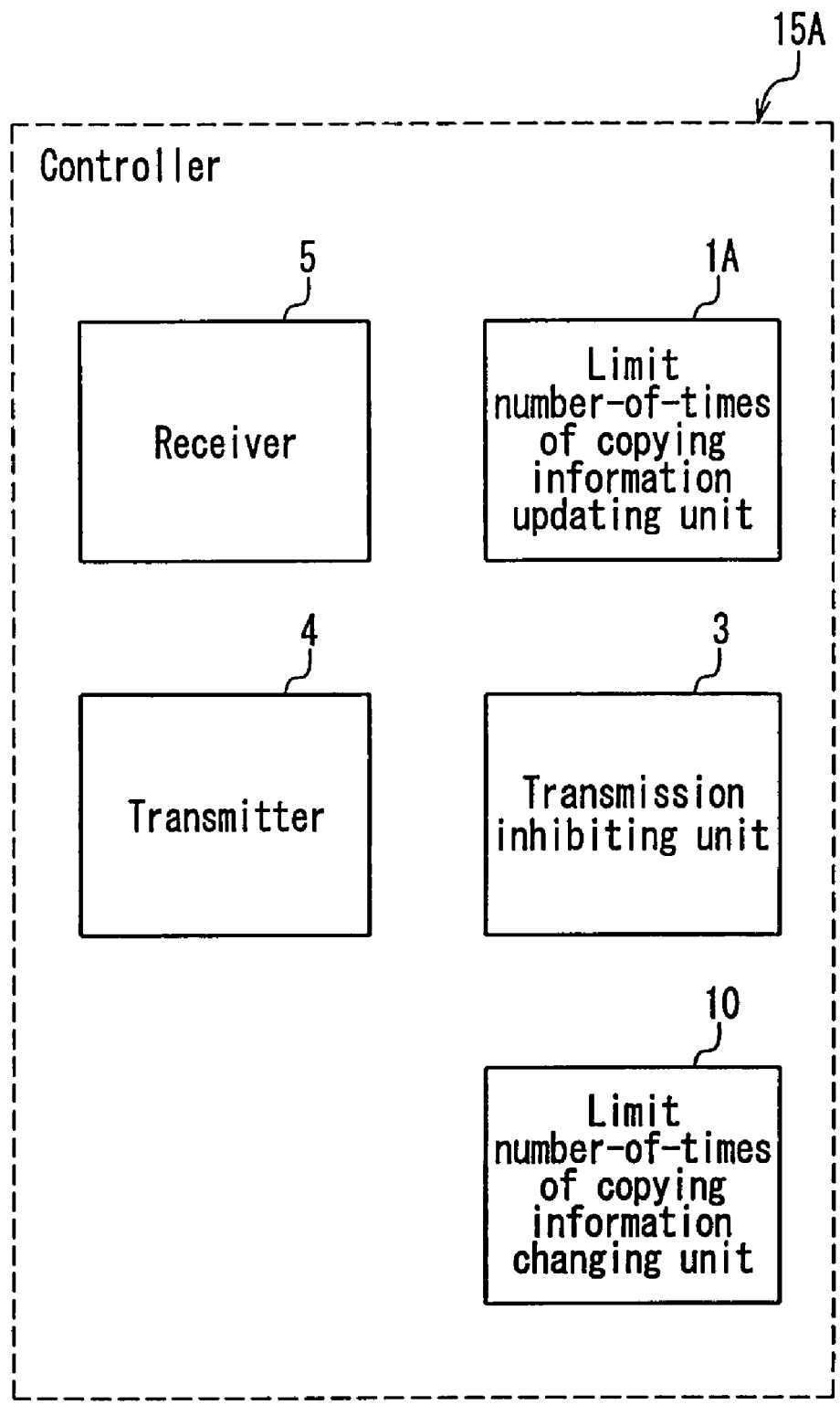
FIG. 3 is a block diagram showing a configuration of a controller provided in another digital camera constituting a digital camera system according to this embodiment.

FIG. 3 is a block diagram showing a configuration of the controller 15A provided in the digital camera 10A. The controller 15A includes a receiver 5. The receiver 5 receives the image data transmitted from the transmitter 4 provided in the digital camera 100 and records them in the information recording medium 9 provided in the digital camera 100A.

The controller 15A is provided with a limited number-of-times of copying information updating unit 1A. The unit 1A reads out image data into an internally stored memory 14 from the information recording medium 9, and updates the limited number-of-times of copying information set with respect to the read image data.

The controller 15A includes a transmitter 4. The transmitter 4 transmits the image data whose limited number-of-times of copying information is updated by the unit 1A. The controller 15A is provided with a transmission inhibiting unit 3. The transmission inhibiting unit 3 inhibits the transmission of the image data by the transmitter 4 when the limited number-of-times of copying information set with respect to the image data is 0.

The controller 15A includes a limited number-of-times of copying information changing unit 10. The unit 10 changes the limited number-of-times of copying information of the image data recorded in the information recording medium 9 provided in the digital camera 100A in accordance with the input of a predetermined password set at the same time when the limited number-of-times of copying information is set with respect to the image data by the unit 2 provided in the digital camera 100.

Figure 4:
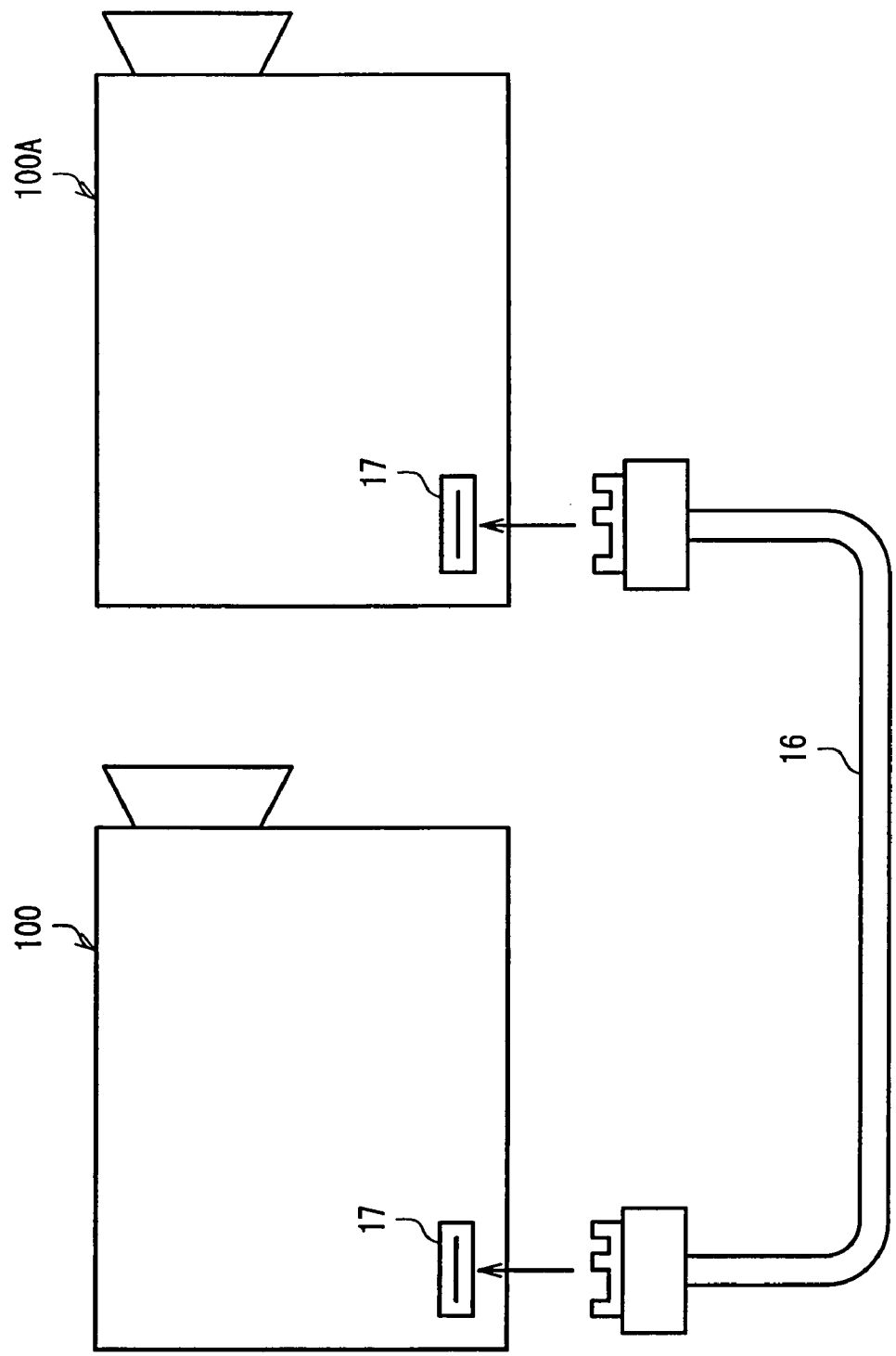
FIG. 4 is a view to explain a connection cable for connecting respective digital cameras and connectors provided in the respective digital cameras constituting a digital camera system of this embodiment.

FIG. 4 is a view to explain a connection cable for connecting the respective digital cameras to the connectors provided in the respective digital cameras. The digital cameras 100 and 100A are provided with a connector 17, respectively. To each connector 17, the cable 16 for electrically connecting the digital camera 100 and the digital camera 100A is connected, respectively.

Transmitting/receiving image data between the digital cameras 100 and 100A via the cable 16 in this way is excellent in that the speed of transmitting data is high, and the transmission can be carried out by using a communication interface that is in general use, for example, USB, IEEE 1394, and the like. On the other hand, it is preferable that when image data are transmitted/received via a radio communication interface such as an infrared data communication, Bluetooth, and the like, the image data can be transmitted/received without additional components such as a connection cable 16.

Hereinafter, in this embodiment, an example in which the connection cable 16 is used will be explained. However, it is apparent that the same effect can be obtained in the case of using the radio communication interface such as an infrared data communication, Bluetooth, and the like.

Figure 5:
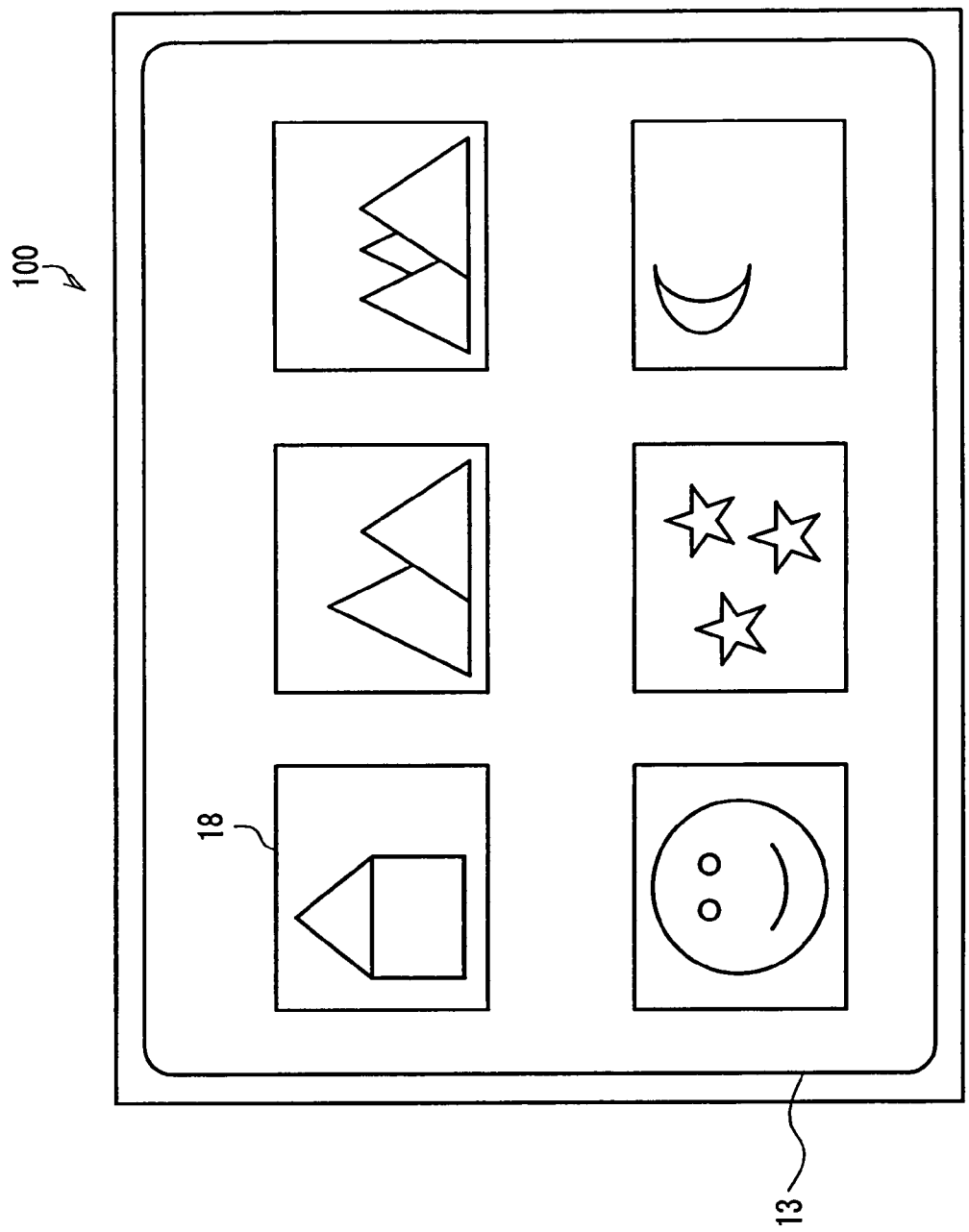
FIG. 5 is a view showing thumbnail images displayed on a monitor provided in a digital camera constituting a digital camera system according to this embodiment.

FIG. 5 is a view showing thumbnail images displayed on the monitor 13 provided in the digital camera. On the monitor 13 provided in the digital camera 100, taken image data can be displayed as thumbnail images 18. The thumbnail image is used as a table of contents showing the image data of a still picture or a motion picture recorded in the information recording medium 9. For the thumbnail image, a condensed picture image of the still picture and a condensed picture image of the first scene of a motion picture are used.

Figure 6:
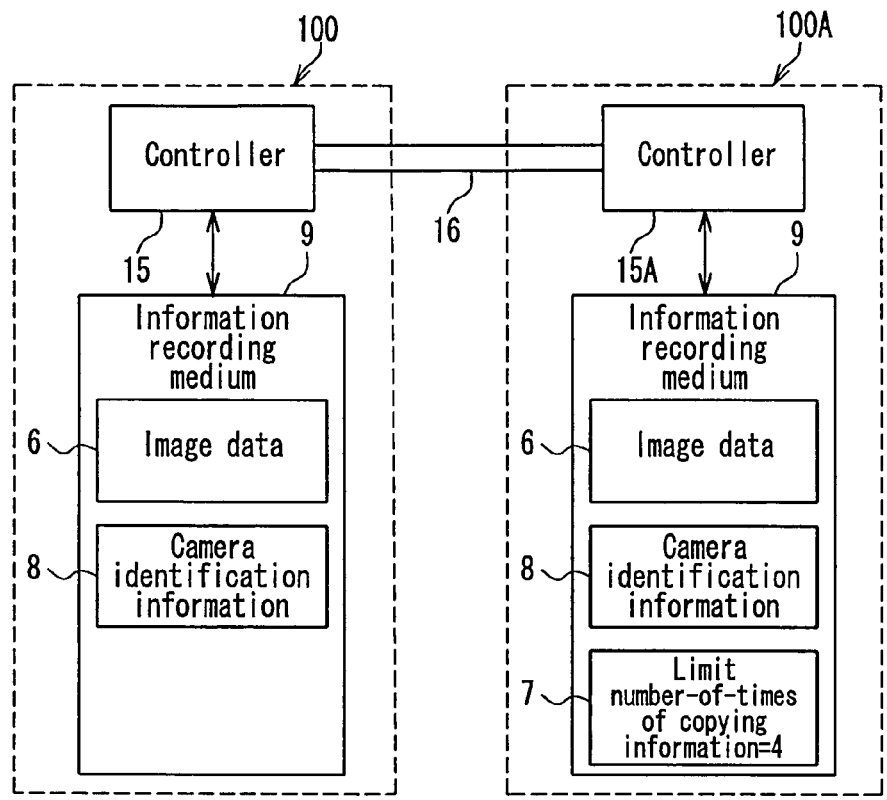
FIG. 6 is a schematic diagram to explain an operation of copying image data from a first digital camera to a second digital camera constituting a digital camera system according to this embodiment.

FIG. 6 is a schematic diagram to explain an operation of copying the image data from the digital camera 100 to the digital camera 100A. In the information recording medium 9 provided in the digital camera 100, image data 6 are stored.

In the image data 6, camera identification information 8 is set further. The camera identification information 8 is information for identifying the digital camera with which the image data 6 is taken and is composed of, for example, a serial number of the digital camera 100.

When one of the thumbnail images displayed on the monitor 13 provided in the digital camera 100 is selected and a predetermined operation, for example, pressing a transmitting button (not shown), etc. is executed, in the image data 6 shown by the one selected thumbnail image, a limited number-of-times of copying information 7 is set by the unit 2.

The limited number-of-times of copying information 7 shows a number-of-times permitted for copying the image data 6. In the example shown in FIG. 6, the limited number-of-times of copying information 7 is set to "4." In this case, the number-of-times permitted for copying the image data 6 is 4 or less. Therefore, in this case, the total number of copied image data 6 except for the original image data in the world must be 5 or less.

The image data 6 in which the limited number-of-times of copying information 7 is set to "4" by the unit 2 are transmitted to the digital camera 100A by the transmitter 4 via the cable 16. The receiver 5 provided in the controller 15A of the digital camera 100A receives the image data 6 in which the limited number-of-times of copying information 7 is set to "4" and records them in the information recording medium 9 provided in the digital camera 100A.

Figure 7:
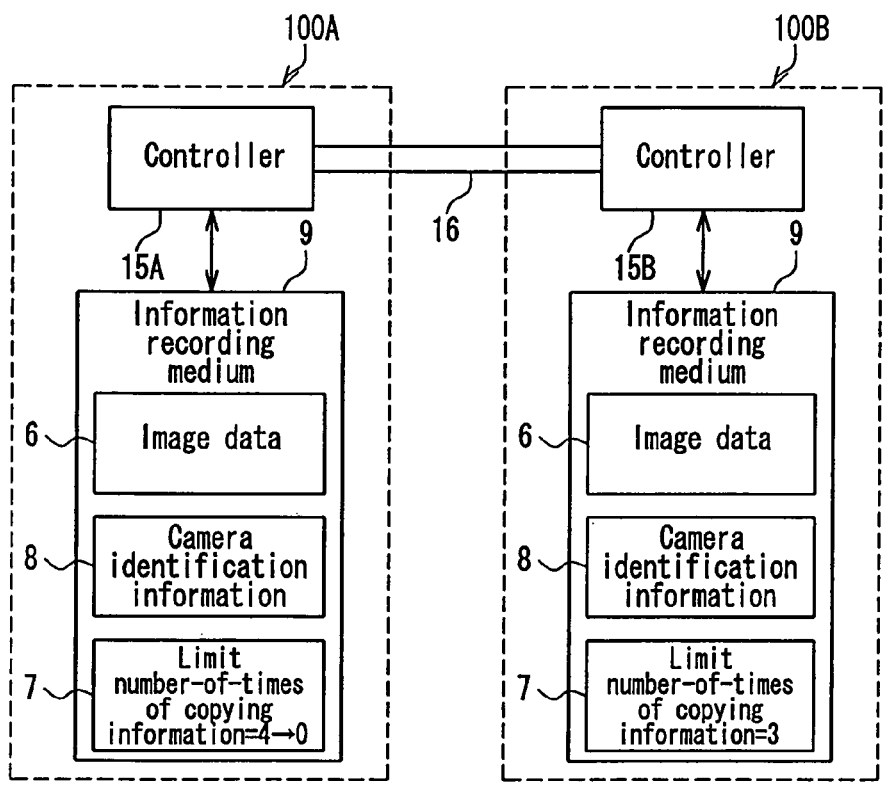
FIG. 7 is a schematic diagram to explain an operation of copying image data from the second digital camera to a third digital camera constituting a digital camera system according to this embodiment.

FIG. 7 is a schematic diagram to explain an operation of copying image data from the digital camera 100A to the digital camera 100B. The digital camera 100B includes the same configuration as that of the digital camera 100A. The limited number-of-times of copying information 7 set with respect to the image data 6 copied from the digital camera 100 to the digital camera 100A is set to "4."

The unit 1A reads out the image data 6 from the information recording medium 9 and updates the limited number-of-times of copying information 7 set with respect to the read image data 6 from "4" to "3." The transmitter 4 transmits the image data 6 whose limited number-of-times of copying information 7 is updated from "4" to "3" to the digital camera 100B via the cable 16.

Then, the unit 1A updates the limited number-of-times of copying information 7 set with respect to the read image data 6 recorded in the information recording medium 9 from "4" to "0." The limited number-of-times of copying information 7 of "0" means that no more image data must be copied to the other digital camera. When the limited number-of-times of copying information 7 is "0," the transmission inhibiting unit 3 inhibits the transmission by the transmitter 4 of the image data 6 whose limited number-of-times of copying information 7 is "0," and for example, displays an error message on the monitor 13 that copying is inhibited.

The receiver 5 provided in the controller 15B of the digital camera 100B receives the image data 6 whose limited number-of-times of copying information 7 is updated from "4" to "3" and records them in the information recording medium 9 provided in the digital camera 100B.

Figure 8:
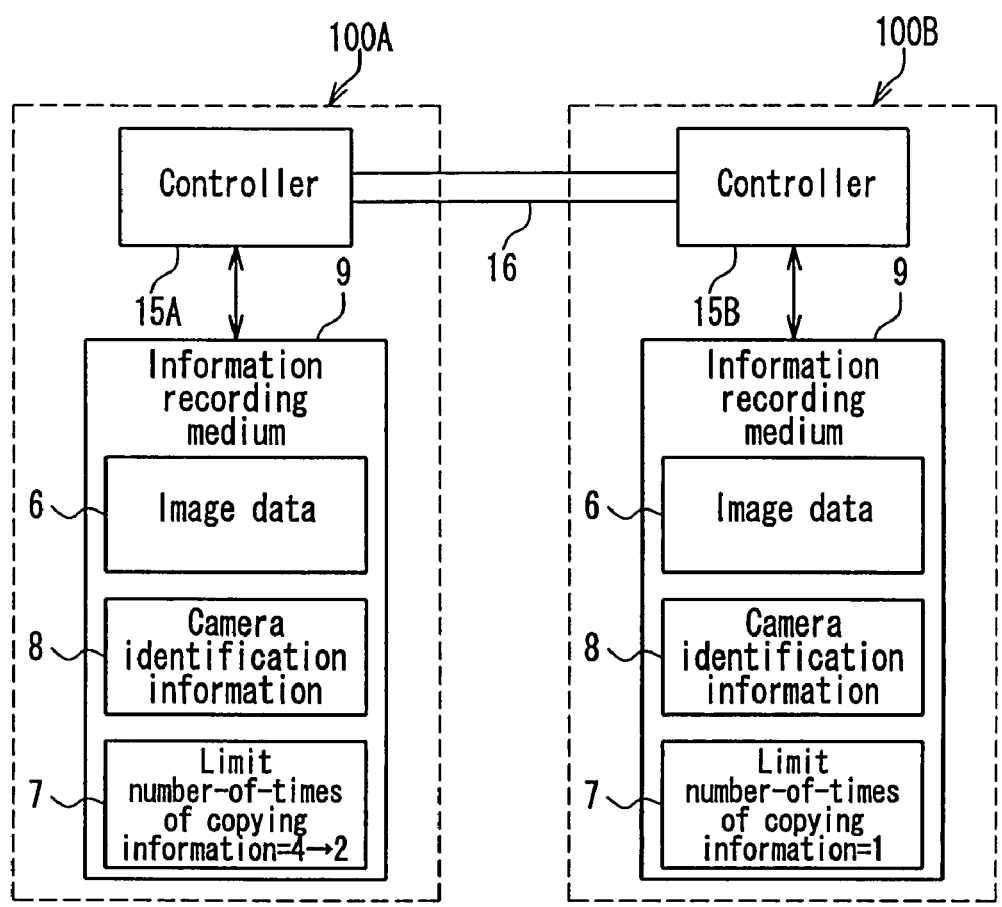
FIG. 8 is a schematic diagram to explain another operation of copying image data from the second digital camera to the third digital camera constituting a digital camera system according to this embodiment.

FIG. 8 is a schematic diagram to explain another operation of copying image data from the digital camera 100A to the digital camera 100B. The limited number-of-times of copying information 7 set with respect to the image data 6 copied from the digital camera 100 to the digital camera 100A is set to "4."

The unit 1A provide in the controller 15A of the digital camera 100A reads out the image data 6 from the information recording medium 9 and updates the limited number-of-times of copying information 7 set with respect to the read image data 6 from "4" to "1." The transmitter 4 provided in the controller 15A of the digital camera 100A transmits the image data 6 whose limited number-of-times of copying information 7 is updated from "4" to "1" to the controller 15B of the digital camera 100B via the cable 16.

Then, the unit 1A provided in the controller 15A of the digital camera 100A updates the limited number-of-times of copying information 7 set with respect to the read image data 6 recorded in the information recording medium 9 from "4" to "2." Therefore, the digital camera 100A can copy the image data 6 to a further different digital camera. Thus, the digital camera 100A also can copy the same image data 6 to a plurality of different digital cameras, respectively.

The image data 6 are copied by repeating the procedures as mentioned above with reference to FIGS. 7 and 8, the "number of pieces" of image data 6 copied in a plurality of digital camera is not beyond "4" shown by the limited number-of-times of copying information 7 set by the unit 2 provided in the controller 15 of the digital camera 100. Namely, a person who takes the image data, that is, a copyright owner of the image data 6 can determine the "number of pieces" of copies existing in the world of the image data 6 from the original.

The camera identification information 8 showing an identification number unique to a digital camera corresponds to the image data 6 one for one. Therefore, it is possible to discriminate whether or not the image data 6 recorded in the information recording medium 9 is the image data taken by the digital camera provided in the information recording medium 9.

For example, when together with the image data 6, the camera identification information 8 showing the identification number unique to the digital camera 100 is copied from the digital camera 100A to the digital camera 100, it is possible to determine that the image data 6 copied from the digital camera 100A to the digital camera 100 are the image data 6 taken by the digital camera 100. Therefore, the unit 2 provided in the controller 15 of the digital camera 1 can set again an arbitrary maximum number-of-times for the limited number-of-times of copying information 7 with respect to the image data 6 copied from the digital camera 100A to the digital camera 100 regardless of the number-of-times of copying information 7 updated by the unit 1A provided in the digital camera 100A.

Furthermore, the unit 2 provided in the digital camera 100 also can set the number-of-times of the limited number-of-times of copying information 7 to an unlimited number (∞: infinite). In this case, the unit 1A provided in the digital camera 100A can freely update the number-of-times of the limited number-of-times of copying information 7. Thus, according to the digital camera system of this embodiment, it is possible to copy image data that is not provided with a copyright or image data whose copyright is disclaimed.

Figure 9:
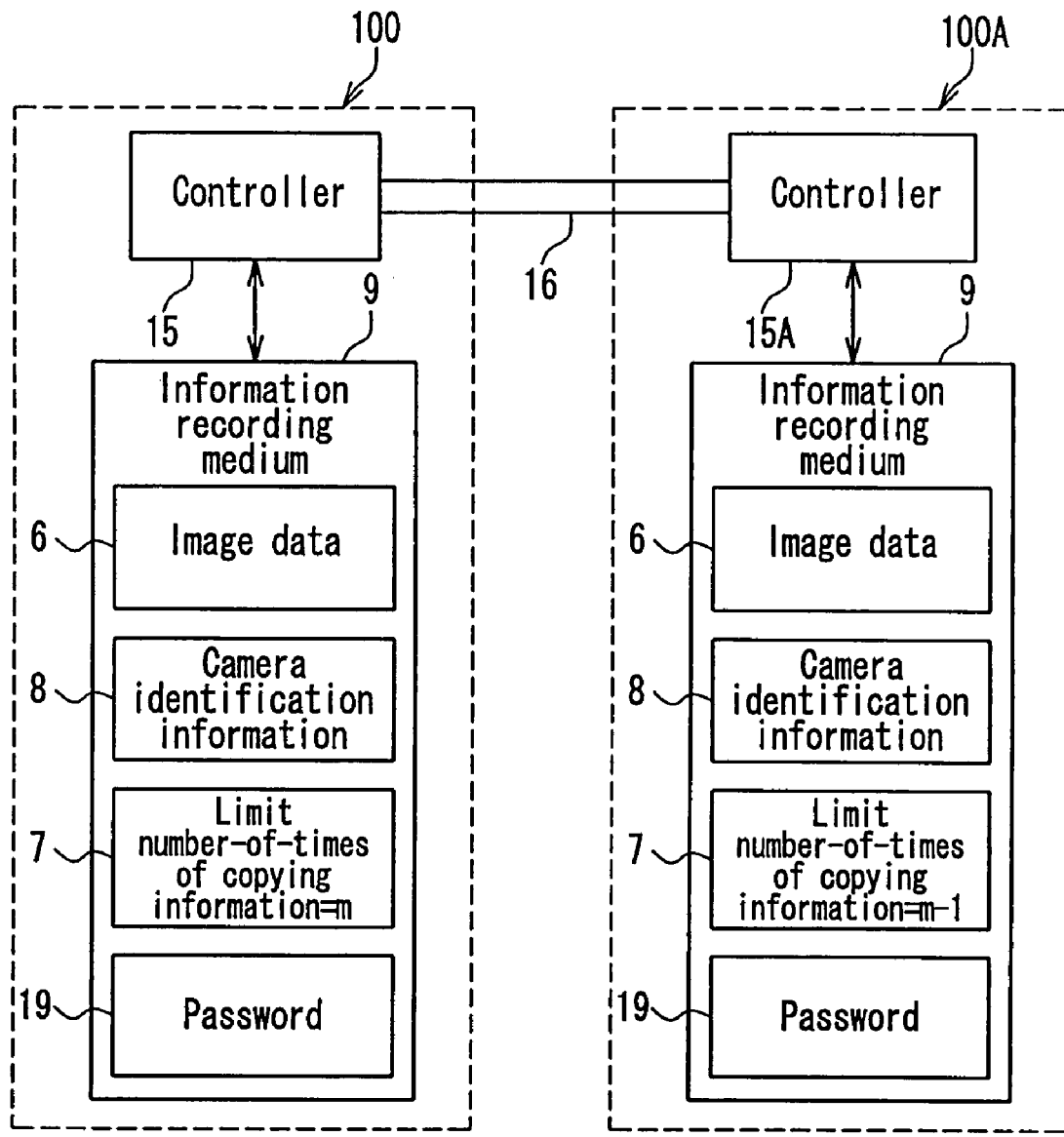
FIG. 9 is a schematic diagram to explain another operation of copying image data from the first digital camera to the second digital camera constituting a digital camera system according to this embodiment.

FIG. 9 is a schematic diagram to explain another operation of copying image data from a first digital camera to a second digital camera. In the image data 6 recorded in the information recording medium 9 provided in the digital camera 100, a password 19, for example, "ABCDE," is set. The password 19 is copied in the information recording medium 9 provided in the digital camera 100A together with the limited number-of-times of copying information 7 and the camera identification information 8 set with respect to the image data 6.

When the password 19 set with respect to the image data 6, for example, "ABCDE" is input to the digital camera 100A, the number-of-times, (m−1), (m denotes an integer of 1 or more) of the limited number-of-times of copying information 7 set with respect to the image data 6 can be changed freely. That is to say, it is possible to freely change the number-of-times, (m−1) of the limited number-of-times of copying information 7 set with respect to the image data 6 only when a password input in the digital camera 100A is determined to be the same as the password 19 recorded in the information recording medium 9 provided in the digital camera 100A.

Note here that when the image data 6 are copied from the digital camera 100A to another digital camera 100B (not shown), the password 19 set with respect to the image data 6 also is copied in the information recording medium 9 provided in another digital camera 100A.

The digital cameras 100 and 100A can be operated respectively based on a program recorded respectively in computer readable recording media 25 and 25A.

Figure 10:
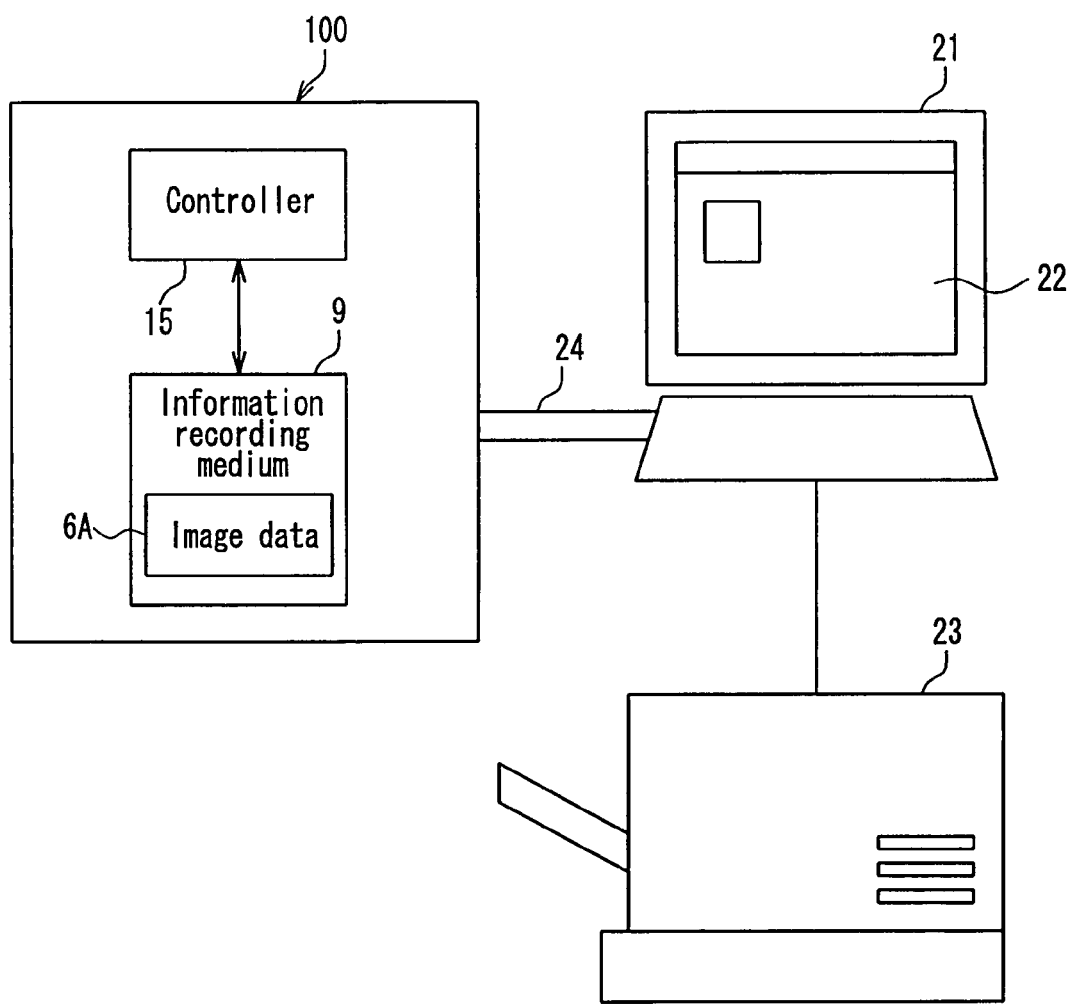
FIG. 10 is a schematic diagram to explain an operation of carrying out browsing and printing by connecting a personal computer and a digital camera constituting a digital camera system according to this embodiment.
Figure 11:
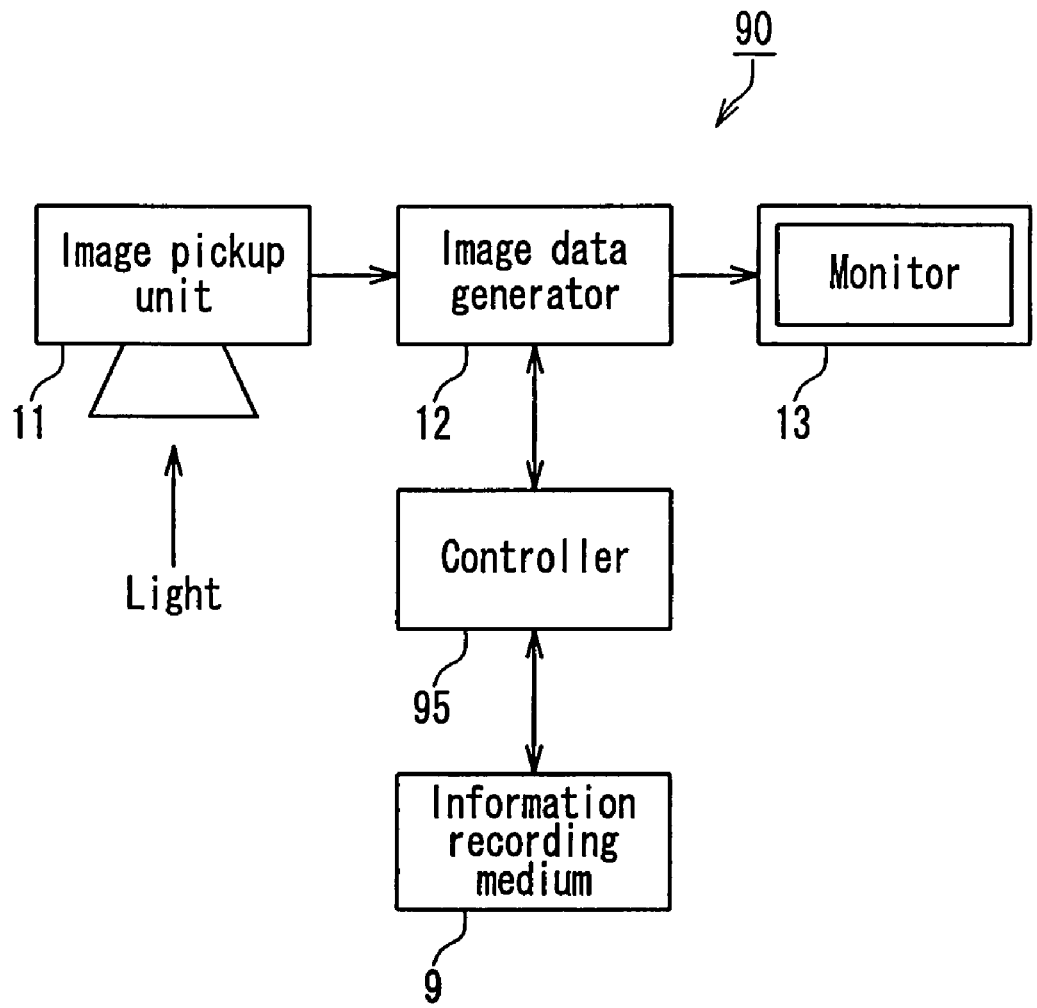
FIG. 11 is a block diagram showing a configuration of a conventional digital camera.

FIG. 10 is a schematic diagram to explain an operation of carrying out browsing and printing by connecting a personal computer 21 and a digital camera 100 constituting a digital camera system according to this embodiment. The digital camera 100 is connected to the personal computer 21 via the PC connection cable 24. As a connecting method, an interface such as USB provided in a general personal computer is desirable.

The image data 6A taken by using the digital camera 100 is stored in the information recording medium 9 provided in the digital camera 100. The image data 6A are recorded in the information recording medium 9 in accordance with the file storing format that is different from the general file storing format such as a JPEG format or a BMP format, etc., for example, in the case of a still picture. Therefore, the image data 6A recorded in the information recording medium 9 cannot be browsed by the file operation from the personal computer 21.

Browsing of the image data 6A recorded in the information recording medium 9 provided in the digital camera 100 can be carried out by installing a special-purpose browsing software 22 in the personal computer 21. By accessing the controller 15 provided in the digital camera 100 from the browsing software 22, a file operation of the image data 6A recorded in the information recording medium 9 can be carried out, and the image data 6A can be browsed. The browsing software 22 has a printing function besides the browsing function and the image data 6A recorded in the information recording medium 9 can be printed by a printer 23 connected to the personal computer 21. Note here that the browsing software 22 does not have a function of copying the image data 6A recorded in the information recording medium 9 into a fixed disk (not shown) provided in the personal computer 21.

Thus, the image data 6A recorded in the information recording medium 9 provided in the digital camera 100 cannot be copied by a general file operation. Furthermore, even if they can be copied, since they are recorded in accordance with the file storing format other than the general file storing format, it is not possible to distribute them for browsing freely despite the intention of a person who takes the image data. Therefore, the copyright of the image data can be protected.

Similar to a conventional digital camera, the digital camera 100 can store the image data 6A in the information recording medium 9 in accordance with a general file storing format such as a JPEG format, a BMP format, etc. in the case of the still picture image. When the digital camera 100 is connected to the personal computer 21 via a PC connection cable 24, since the copyright of the image data 6A is not protected, the image data 6A recorded in the information recording medium 15 can be copied in a fixed disk (not shown) provided in the personal computer 21 or a floppy disk via the controller 15 provided in the digital camera 100 by directly operating from the personal computer 21. The image data 6A stored in accordance with the JPEG format or BMP format can be browsed or printed by using a general file browsing software.

Note here that the image data 6A recorded in the information recording medium 9 provided in the digital camera 100 can be converted between a special purpose file storing format whose copyright is protected and a general file storing format whose copyright is not protected. For converting the image data 6A between the special purpose file storing format whose copyright is protected and a general file storing format whose copyright is not protected, the camera identification information 8 set with respect to the image data 6A is required to show an identification number unique to the digital camera 100. When the password is set with respect to the image data 6A, it is necessary to input the set password when the password is set with respect to the image data 6A.

As mentioned above, according to this embodiment, the limited number-of-times of copying information 7 showing the number-of-times permitted for copying the image data 6 is updated by the unit 1A. Therefore, when the number-of-times shown by the limited number-of-times of copying information 7 becomes 0 after being updated, the transmission of the image data 6 for copying the image data 6 can be inhibited. As a result, it is possible to prevent the image data 6 from being distributed regardless of the intention of a copyright owner who set the number-of-times of copying the image data 6 by the limited number-of-times of copying information 7.

Note here that in this embodiment, the example in which the limited number-of-times of copying information 7, the camera identification information 8 and the password 19 are set with respect to the image data and recorded in one file is shown. However, the present invention is not necessarily limited to this. The limited number-of-times of copying information 7, the camera identification information 8 and the password 19 may be recorded in a predetermined region of the information recording medium as a file that is separate from the image data so that they correspond to the image data one for one.

The limited number-of-times of copying information 7, the camera identification information 8 and the password 19 may be recorded in a state which they are encrypted so that the image data cannot be edited easily by the use of an editor, etc.

In this embodiment, the example in which the information recording apparatus is a digital camera is shown. However, it is apparent that the present invention can be applied to a personal computer, an information terminal and a portable telephone having a function of camera.

In the information recording apparatus according to this embodiment, a copyright owner of electronic data limits the number of copied electronic data existing in the world, thereby protecting the justifiable copyright with respect to works of the electronic data. Therefore, the information recording apparatus is not necessarily limited to a digital camera, and the electronic data are not necessarily limited to image data. That is to say, the present invention can be applied to the other information recording apparatus that copes with the other electronic data such as audio data. For example, the present invention can be applied to an embodiment in which a copyright owner of performing music limits the number-of-times of copying music data by live-recording the performance of the copyrighted music.

Industrial Applicability

As mentioned above, according to the present invention, it is possible to provide an information recording apparatus capable of protecting justifiable copyright with respect to electronic data recorded in an information recording medium.

The invention claimed is:

1. An information apparatus, comprising:
a second reception part for receiving electronic data on which a copy limit is imposed;
a second information apparatus for recording the electronic data received at the second reception part in a second information recording medium;
a third information apparatus for reading out the electronic data recorded in the second information recording medium to record the electronic data in a third information recording medium; and
a second copy limit information setting unit that is capable of updating a permitted number-of-times of copying the electronic data,
wherein the second copy limit information setting unit is capable of setting a permitted number-of-times of copying the electronic data about to be recorded in the third information recording medium to R (R is an integer of 0 or more and M−1 or less) when a permitted number-of-times of copying the electronic data recorded in the second information recording medium of M (M is an integer of 0 or more) is not 0, and
the second copy limit information setting unit updates the permitted number-of-times of copying the electronic data recorded in the second information recording medium of M to a permitted number-of-times of copying of (M−(R+1)) when the electronic data whose permitted number-of-times of copying has been set to R are recorded in the third information recording medium.

2. The information apparatus according to claim 1, wherein the second information apparatus comprises a second transmission part for transmitting the electronic data on which the copy limit is imposed to the third information apparatus, and the third information apparatus comprises a third reception part for receiving the electronic data on which the copy limit is imposed from the second information apparatus.

3. The information apparatus according to claim 1, wherein the second information apparatus comprises a recording inhibiting part for inhibiting the electronic data from being recorded in the third information recording medium when the permitted number-of-times of copying the electronic data recorded in the second information recording medium of M is 0.

4. A method for copying information, comprising:
an electronic data receiving step for receiving electronic data on which a copy limit is imposed at a reception part;
  a second recording step for recording the electronic data received at the reception part in a second information recording medium;
  a third recording step for reading out the electronic data recorded in the second information recording medium to record the electronic data in a third information recording medium; and
  an updating step for updating a permitted number-of-times of copying the electronic data,
  wherein in the updating step,
  a permitted number-of-times of copying the electronic data about to be recorded in the third information recording medium is set to R (R is an integer of 0 or more and M−1 or less) when a permitted number-of-times of copying the electronic data recorded in the second information recording medium of M (M is an integer of 0 or more) is not 0, and
  the permitted number-of-times of copying the electronic data recorded in the second information recording medium of M is updated to a permitted number-of-times of copying of (M−(R+1)) when the electronic data whose permitted number-of-times of copying has been set to R are recorded in the third information recording medium.

5. The method according to claim 4, further comprising a copy limit information setting step for setting the copy limit with respect to the electronic data.

6. An information copying system, comprising: a first information recording apparatus; and a second information recording apparatus,
  the first information recording apparatus comprising:
    a number-of-copies information setting unit for setting, with respect to predetermined electronic data, number-of-copies information N (N is a natural number of 1 or more) that shows a number of the electronic data;
    a first limited number-of-times of copying information updating unit for reading out the electronic data from a first information recording medium in which the electronic data with respect to which the number-of-copies information N has been set are recorded and setting limited number-of-times of copying information that shows a number-of-times permitted for copying the electronic data to a number-of-times of M (M is an integer of 0 or more and N−1 or less) with respect to the number-of-copies information N set with respect to the read electronic data; and
    a first transmitter for transmitting the electronic data with respect to which the limited number-of-times of copying information has been set by the first limited number-of-times of copying information updating unit, and
  the second information recording apparatus comprising:
    a second receiver for receiving the electronic data transmitted from the first transmitter;
    a second limited number-of-times of copying information updating unit for reading out the electronic data from a second information recording medium in which the electronic data received by the second receiver are recorded, the unit being capable of updating the limited number-of-times of copying information to a number-of-times of R (R is an integer of 0 or more and M−1 or less) when the number-of-times of M of the limited number-of-times of copying information set with respect to the read electronic data is not 0 and
    a second transmitter for transmitting the electronic data whose limited number-of-times of copying information has been updated by the second limited number-of-times of copying information updating unit,
    wherein the second limited number-of-times of copying information updating unit updates the limited number-of-times of copying information set with respect to the electronic data recorded in the second information recording medium from the number-of-times of M to a number-of-times of (M−(R+1)) when the electronic data whose limited number-of-times of copying information has been updated to the number-of-times of R are transmitted.

7. An information copying system, comprising: a first information recording apparatus; and a second information recording apparatus,
  the first information recording apparatus comprising:
    a first limited number-of-times of copying information updating unit for setting, with respect to predetermined electronic data, limited number-of-times of copying information that shows a number-of-times permitted for copying the electronic data to a number-of-times of M (M is an integer of 0 or more); and
    a first transmitter for transmitting the electronic data with respect to which the limited number-of-times of copying information has been set by the first limited number-of-times of copying information updating unit, and
  the second information recording apparatus comprising:
    a second receiver for receiving the electronic data transmitted from the first transmitter;
    a second limited number-of-times of copying information updating unit for reading out the electronic data from a second information recording medium in which the electronic data received by the second receiver are recorded, the unit being capable of updating the limited number-of-times of copying information to a number-of-times of R (R is an integer of 0 or more and M−1 or less) when the number-of-times of M of the limited number-of-times of copying information set with respect to the read electronic data is not 0; and
    a second transmitter for transmitting the electronic data whose limited number-of-times of copying information has been updated by the second limited number-of-times of copying information updating unit,
    wherein the second limited number-of-times of copying information updating unit updates the limited number-of-times of copying information set with respect to the electronic data recorded in the second information recording medium from the number-of-times of M to a number-of-times of (M−(R+1)) when the electronic data whose limited number-of-times of copying information has been updated to the number-of-times of R are transmitted.

8. The information copying system according to claim 7, further comprising: a third information recording apparatus,
wherein the third information recording apparatus comprises:
a third receiver for receiving the electronic data transmitted from the second transmitter;
a third limited number-of-limes of copying information updating unit for reading out the electronic data from a third information recording medium in which the electronic data received by the third receiver are recorded, the unit being capable of updating the limited number-of-times of copying information to a number-of-times of Q (Q is an integer of 0 or more and R−1 or less) when the number-of-times of R of the limited number-of-times of copying information set with respect to the read electronic data is not 0; and
a third transmitter for transmitting the electronic data whose limited number-of-times of copying information has been updated by the third limited number-of-times of copying information updating unit,
wherein the third limited number-of-times of copying information updating unit updates the limited number-of-times of copying information set with respect to the electronic data recorded in the third information recording medium from the number-of-times of R to a number-of-times of (R−(Q+1)) when the electronic data whose limited number-of-times of copying information has been updated to the number-of-times of Q are transmitted.

9. The information copying system according to claim 7,
wherein the second information recording apparatus comprises a transmission inhibiting unit for inhibiting the transmission of the electronic data when the number-of-times of M of the limited number-of-times of copying information set with respect to the electronic data is 0.

10. The information copying system according to claim 7,
wherein the first information recording apparatus further comprises a first receiver for receiving the electronic data transmitted from the second transmitter, and
the first limited number-of-times of copying information updating unit is provided in such a manner in which the limited number-of-times of copying information of the electronic data received by the first receiver can be changed freely.

11. The information copying system according to claim 7, wherein the electronic data are image data, and
the first information recording apparatus further comprises:
an image pickup unit for picking up an image of a subject to generate an image pickup signal; and
an image data generating unit for generating the image data based on the image pickup signal generated by the image pickup unit.

12. The information copying system according to claim 7,
wherein the first information recording apparatus and the second information recording apparatus are digital cameras.

* * * * *